(12) United States Patent
Lee et al.

(10) Patent No.: US 7,376,685 B2
(45) Date of Patent: May 20, 2008

(54) APPARATUS AND METHOD FOR COMPUTING SHA-1HASH FUNCTION

(75) Inventors: Yun Kyung Lee, Kyungsangbuk-do (KR); Sung Ik Jun, Daejeon (KR); Young Soo Park, Daejeon (KR); Sang Woo Lee, Daejeon (KR); Young Sae Kim, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 716 days.

(21) Appl. No.: 10/917,685

(22) Filed: Aug. 12, 2004

(65) Prior Publication Data

US 2005/0144204 A1 Jun. 30, 2005

(30) Foreign Application Priority Data

Dec. 26, 2003 (KR) ............... 10-2003-0097149

(51) Int. Cl.
  *G06F 7/00* (2006.01)
(52) U.S. Cl. ..................... 708/200; 380/28
(58) Field of Classification Search ........... 708/200, 708/250; 380/28
  See application file for complete search history.

(56) References Cited

U.S. PATENT DOCUMENTS 7,142,669 B2 * 11/2006 Dworkin et al. ......... 380/28

2002/0184498 A1 * 12/2002 Qi ..................... 713/168
2003/0185391 A1   10/2003 Qi et al.
2003/0198342 A1 * 10/2003 Condorelli et al. ....... 380/37
2004/0260740 A1 * 12/2004 Liu .................... 708/490

FOREIGN PATENT DOCUMENTS

JP       2001-282106       10/2001
KR    10-2003-0004771       1/2003
KR    1020030004771 A      1/2003

* cited by examiner

*Primary Examiner*—Michael Yaary
(74) *Attorney, Agent, or Firm*—Blakely, Sokoloff, Taylor & Zafman LLP

(57) ABSTRACT

An apparatus and method for computing a SHA-1 hash function value are provided. The apparatus includes a first register unit including a plurality of registers that store a first bit string of predetermined lengths for generation of a hash function value; a second register unit storing input data in units of second bit strings with predetermined lengths, and sequentially outputting the second bit strings; a third register unit performing an operation on the first bit string of the plurality of registers and the second bit strings output from the second register unit so as to generate and store a third bit string, and updating first-bit string of the plurality of registers based on the third bit string; and an adding unit combining the first bit string stored in the first register unit, the first bit string of the third bit string stored in the third register unit, and the original initial values stored in the first register unit so as to obtain a hash function value. Accordingly, it is possible to reduce the size of the apparatus and stably compute a hash function value at a high speed.

8 Claims, 4 Drawing Sheets

APPARATUS AND METHOD FOR COMPUTING SHA-1 HASH FUNCTION

BACKGROUND OF THE INVENTION

This application claims the priority of Korean Patent Application No. 2003-97149, filed on Dec. 26, 2003, in the Korean Intellectual Property Office, the disclosure of which is incorporated herein in its entirety by reference.

1. Field of the Invention

The present invention relates to an apparatus and method for computing a value of a hash function allowing compression of a message to increase the efficiency of digital signing that guarantees authentication and integrity of important information.

2. Description of the Related Art

Secure Hash Algorithms (SHAs) are algorithms developed by the National Institute of Standards and Technology (NIST), defined in the Federal Information Processing Standard (FIPS) 180-1. SHA-1, which is a type of SHA, divides an incoming message into units of 512-bit blocks using separation or zero padding, performs a rounding operation on the 512-bit blocks 80 times, and outputs a 160-bit compressed message. In particular, the SHA-1 hash algorithm generates a digital signature for the compressed message, thereby reducing the time required for digital signing.

The SHA is mainly used to increase the efficiency of digital signing. Thus, it is important to perform the algorithm quickly and reduce the size of an algorithm processor to minimize the load on a system due to addition of the processor. Most of the existing SHAs are embodied as software. Therefore, there is a growing need for development of an SHA-1 processor (or an SHA-1 hash operation unit) that can process data faster than SHAs embodied as software and serve power saving and safety of data.

SUMMARY OF THE INVENTION

According to one aspect of the present invention, there is provided an apparatus for computing a SHA-1 hash function, the apparatus including a first register unit including a plurality of registers that store a first bit string of predetermined lengths for generation of a hash function value; a second register unit storing input data in units of second bit strings with predetermined lengths, and sequentially outputting the second bit strings; a third register unit performing an operation on the first bit string of the plurality of registers and the second bit strings output from the second register unit so as to generate and store a third bit string, and updating first-bit string of the plurality of registers based on the third bit string; and an adding unit combining the first bit string stored in the first register unit, the first bit string of the third bit string stored in the third register unit, and the original initial values stored in the first register unit so as to obtain a hash function value.

According to another aspect of the present invention, there is provided a method of computing a SHA-1 hash function, the method including (a) storing initial values in registers A, B, C, D, and E; (b) dividing input data into bit strings of predetermined lengths, storing the bit strings in a register W, and outputting the stored bit strings; (c) performing a predetermined logic operation on the respective initial values stored in the registers A, B, C, D, and E, and the bit strings stored in the register W; (d) calculating intermediate values of the registers A, B, C, D, and E based on a result of the predetermined logic operation, updating the initial values of the registers A, B, C, D, and E with their intermediate values, and storing the updated initial values in the registers A, B, C, D, and E; (e) repeatedly performing (a) through (e) a predetermined number of times, and obtaining final values of the registers A, B, C, D, and E by combining the respective intermediate values stored in the registers A, B, C, D, and E with their original initial values.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
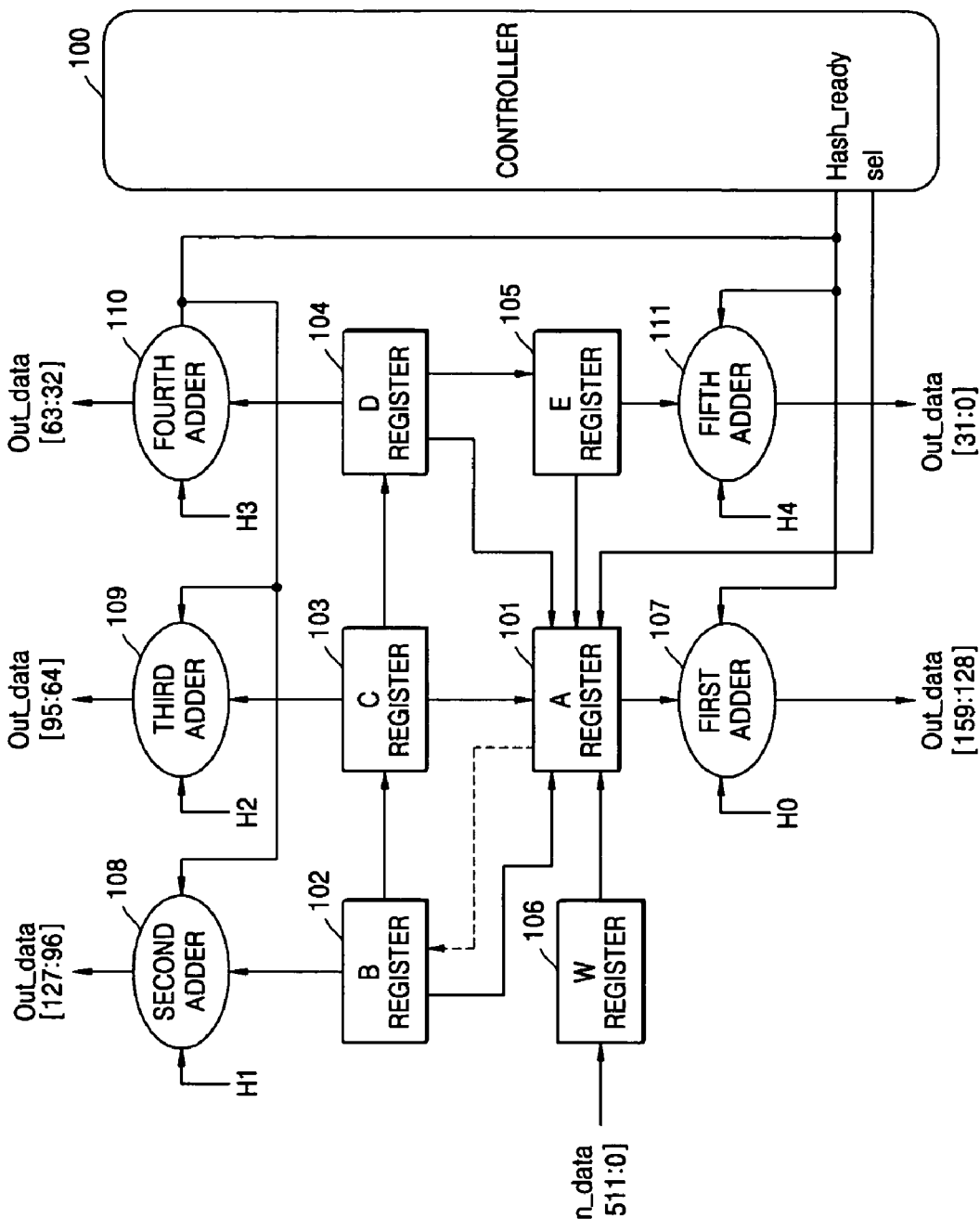
FIG. 1 is a schematic block diagram of an apparatus for computing a SHA-1 hash function value according to an embodiment of the present invention.

Exemplary embodiments of the present invention will be described in detail with reference to the attached drawings. The same reference numerals represent the same elements throughout the drawings.

FIG. 1 is a schematic block diagram of an apparatus for computing a SHA-1 hash function value according to an embodiment of the present invention. The apparatus of FIG. 1 includes a controller 100 that controls the execution of a rounding operation and the generation of a hash function value; registers A, B, C, D, E, and W 101, 102, 103, 104, 105, and 106 that compute and store values A, B, C, D, E, and W required to generate the hash function value, respectively; and first through fifth 32-bit adders 107, 108, 109, 110, and 111 that are activated or deactivated in response to an addition control signal Hash_ready input from the controller 100.

When computing of the hash function value begins, initial values of the register B 102, the register C 103, the register D 104, and the register E 105, and a most significant 32-bit value output from the Register W 106 are input to the Register A 101. Then, the register A 101 performs a rounding operation to compute a value A, and at the same time, the registers B, C, D, and E 102 through 105 perform a rounding operation to obtain values B, C, D, and E, respectively.

The obtained value A output from the register A 101 is input to both the register B 102 and the first 32-bit adder 107. The value B, which is computed using the initial value of the register B 102 by the Register B 102, is input to both the register C 103 and the second 32-bit adder 108. The value C, which is computed using the initial value of the register C 103 by the Register C 103, is input to both the register D 104 and the third 32-bit adder 109. The value D, which is computed using the initial value of the register D 104 by the register D 104, is input to both the register E 105 and the fifth 32-bit adder 110. Then, a first rounding operation is completed.

A second rounding operation starts when a hash operation activation clock becomes a value of 1. In general, the hash operation activation clock is a system clock. The hash operation activation clock will be referred to as a clock hereinafter. Similarly to the first rounding operation, during the second rounding operation, the respective registers A through E 101 through 105 receive 32-bit values that are the result of the first rounding operation, perform the second rounding operation thereon, and output the results of the rounding operation to corresponding registers A through E 101 through 105 and 32-bit adders 107 through 111. The adders 107 through 111 operate only when the addition control signal Hash_ready has a value of 1 and do not operate when it has a value of 0. A value of the addition control signal Hash_ready is initially adjusted to 0 and changed to 1 when a value of a counter (not shown) of the controller 100 reaches 79. Here, the counter value is increased by 1 from 0 to 79. The reason why the counter value is increased from 0 to 79 is that the SHA-1 hash algorithm performs a rounding operation 80 times as described above.

When the addition control signal Hash_ready has a value of 1, a 32-bit value output from the register A 101 and a 32-bit value H0, which is the initial value of the register A 101, are input to the first adder 107, and the first adder 107 combines the input values to generate a first most significant 32-bit value out_data [159:128]. Simultaneously, a 32-bit value output from the register B 102 and a 32-bit value H1, which is the initial value of the register B 102, are input to the second adder 108, and the second adder 108 combines the input values to generate a second most significant 32-bit value out_data [127:96].

Next, a 32-bit value output from the register C 103 and a 32-bit value H2, which is the initial value of the register C 103, are input to the third adder 109 and the third adder 109 combines these values to generate a third most significant 32-bit value out_data [95:64]. Next, a 32-bit value output from the register D 104 and a 32-bit value H3, which is the initial value of the register D 104, are input to the fourth adder 110, and the fourth adder 110 combines these values to generate a fourth most significant 32-bit value out_data [63:32]. Next, a 32-bit value output from the register E 105 and a 32-bit value H4, which is the initial value of the register E 105, are input to the fifth adder 111, and the fifth adder 111 combines these values to generate a least most significant 32-bit value out_data [31:0]. Then, a 160-bit hash function value is obtained.

Internal operations in the register A 101 and the register W 106 will be later described in detail with reference to FIGS. 2 and 3. First, internal operations in the registers B through E 102 through 105 will now be described.

While the register B 102, the register D 104, and the register E 105 only receive the input 32-bit values and output the 32-bit values, the register C 103 also rotates the input 32-bit value to the left by 30 bits when the clock has a value of 1 and outputs the value obtained by shifting. In other words, two least significant bit values input to the register C 103 are output as two most significant bit values, and a most significant bit value input thereto is output as a third most significant bit value.

Figure 2:
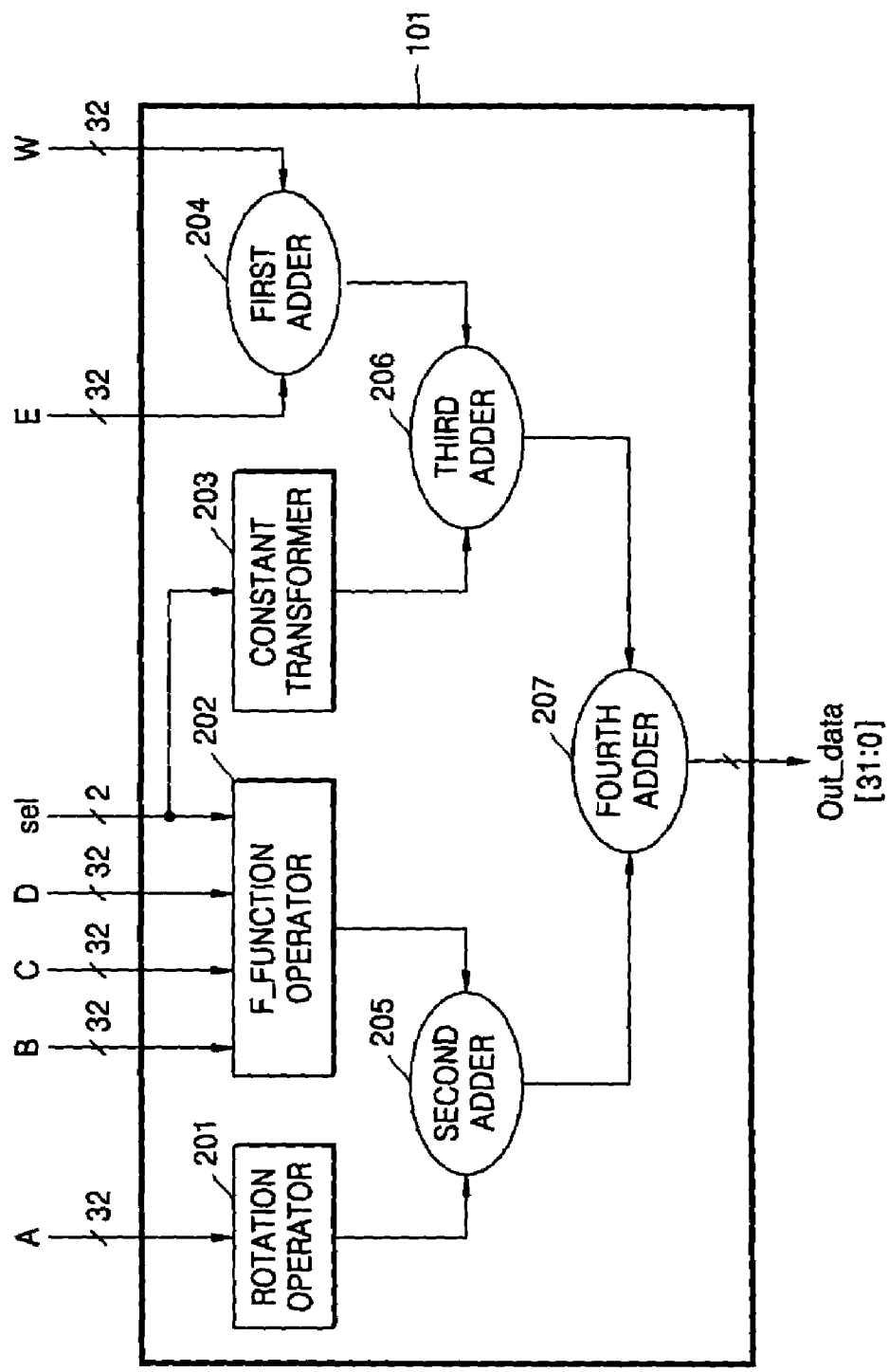
FIG. 2 is a schematic block diagram of a register A of FIG. 1.

FIG. 2 is a block diagram of the Register A 101 of FIG. 1 according to an embodiment of the present invention. When 32-bit data A, B, C, D, E, and W and a signal sel are input to the Register A 101, a rotation operator 201 rotates the 32-bit data A to the left by 5 bits (<<5). Also, an F-function operator 202 performs an F-function operation on the 32-bit data B, C, and D and 32-bit data is obtained as a result of the F-function operation.

The signal sel, output from the controller 100 of FIG. 1, is used to control the F function operator 202. The value of the signal sel denotes the number of times that a rounding operation is to be performed. For instance, the values of the signal sel are 00, 01, 10, and 11, when values of the counter in the controller range from 0 to 19, from 20 to 39, from 40 to 59, and from 60 to 79, respectively.

A value of the F-function changes according to a value of the signal sel, as follows:
F(B,C,D)=(B and C) or (not B and D) (sel=00)
F(B,C,D)=(B xor C xor D) (sel=01 or sel=11)
F(B,C,D)=(B and C) or (B and D) or (C and D) (sel=10)

A constant transformer 203 transforms a predetermined constant into different hexadecimal numbers according to a value of the signal sel. For instance, when the signal sel with a value of 00 is input to the constant transformer 203, it outputs a value of 5A827999. When the signal sel with a value of 01 is input, the constant transformer 203 outputs a value of 6ED9EBA1. When the signal sel with a value of 10 is input, the constant transformer 203 outputs a value of 8F1BBCDC. When the signal sel with a value of 11 is input, the constant transformer 203 outputs a value of CA62C1 D6.

Outputs of the rotation operator 201 and the F-function operator 202 are input to and combined by a second adder 205. The 32-bit data E and W input from the register A 101 are input to and combined by a first adder 204. The result of combination output from the first adder 204 and a value output from the constant transformer 203 are input to and combined by a third adder 206. Results of combination output from the second and third adders 205 and 206 are input to and combined by a fourth adder 207, thus obtaining a value Out_data [31:0]. The value Out_data [31:0] is output from the Register A 101.

Figure 3:
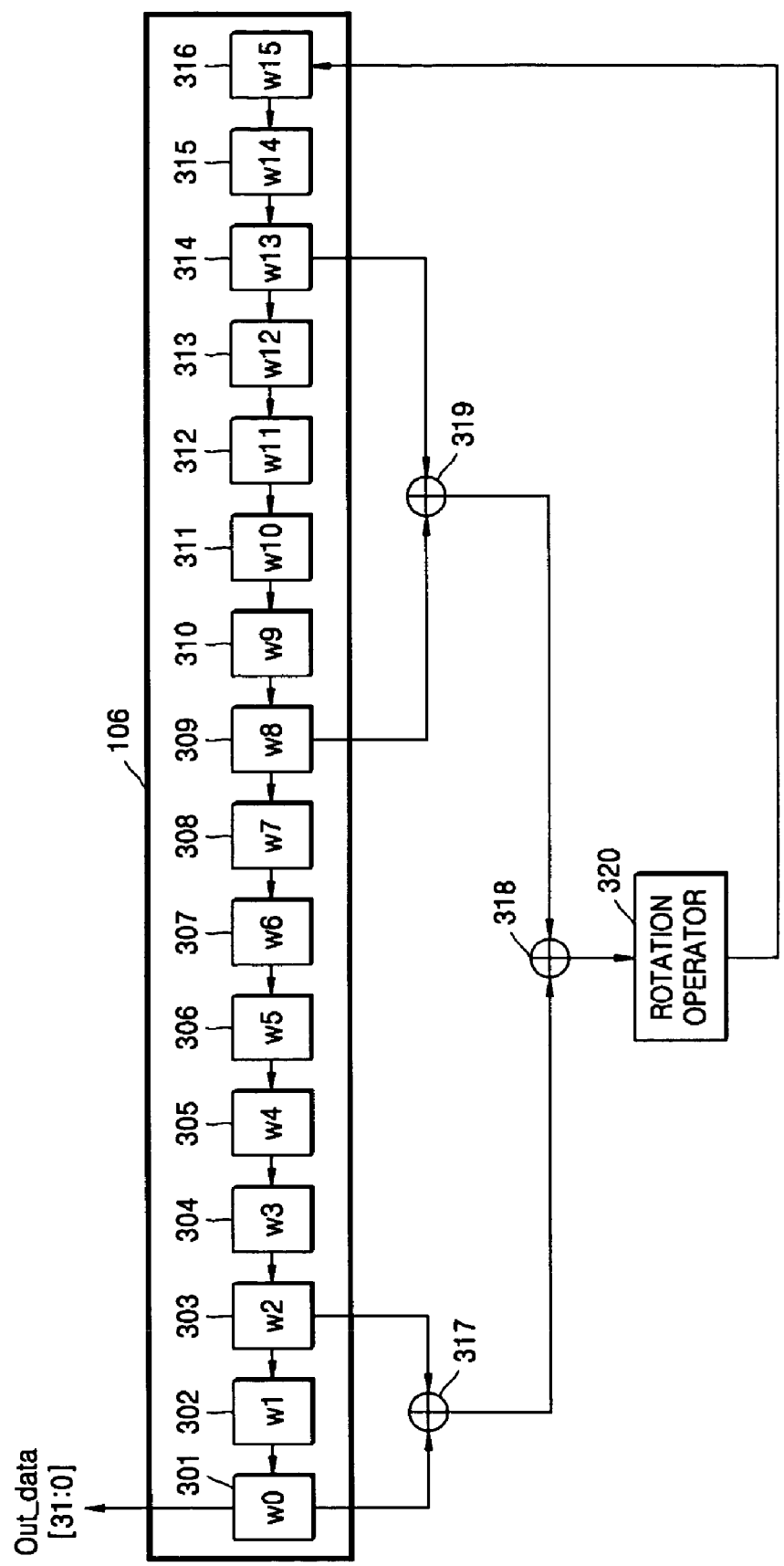
FIG. 3 is a schematic block diagram of a Register W of FIG. 1.

FIG. 3 is a block diagram of the register W 106 of FIG. 1 according to an embodiment of the present invention. When 512-bit data In_data [511:0] is input to the register W 106, the register W 106 divides it into sixteen 32-bit data and sequentially stores the respective 32-bit data in w0 through w15 registers 301 through 316. That is, the most significant 32 bits of the 512-bit data are stored in the w0 register 301 and least significant 32 bits thereof are stored in the w15 register 316. When a clock has a value of 1, an output of the w0 register 301 is output as an output of the Register W 106, a first XOR operator 317 performs an XOR operation on the outputs of the w0 register 301 and the w2 register 303, and a second XOR operator 319 performs an XOR operation on the outputs of the w8 register 309 and the w13 register 314. Next, a third XOR operator 318 performs an XOR operation on results of the first and second XOR operations 317 and 319. A rotation operator 320 rotates a result of the XOR operation to the left by 1 bit so as to shift the 32-bit data of the registers w1 through w15 to the registers w0 through w14, respectively. Then, the rotation operator 320 stores the result of rotation.

That is, an output of the w1 register 302 is moved to the w0 register 301, an output of the w2 register 303 is moved to the w1 register 302, and an output of the rotation operator 320 is moved to the w15 register 316. When a subsequent clock has a value of 1, 32-bit data stored in the w0 register is output as an output of the Register W 106, and XOR operations are performed by the XOR operators 317, 318, and 319, and a rotation operation is performed by the rotation operator 320. Next, outputs of the w1 register 310 through the w15 register 316 are shifted by 32 bits in the left direction, and the result of rotation is stored in the w 15 register 316. The rotation operation is performed 80 times.

Figure 4:
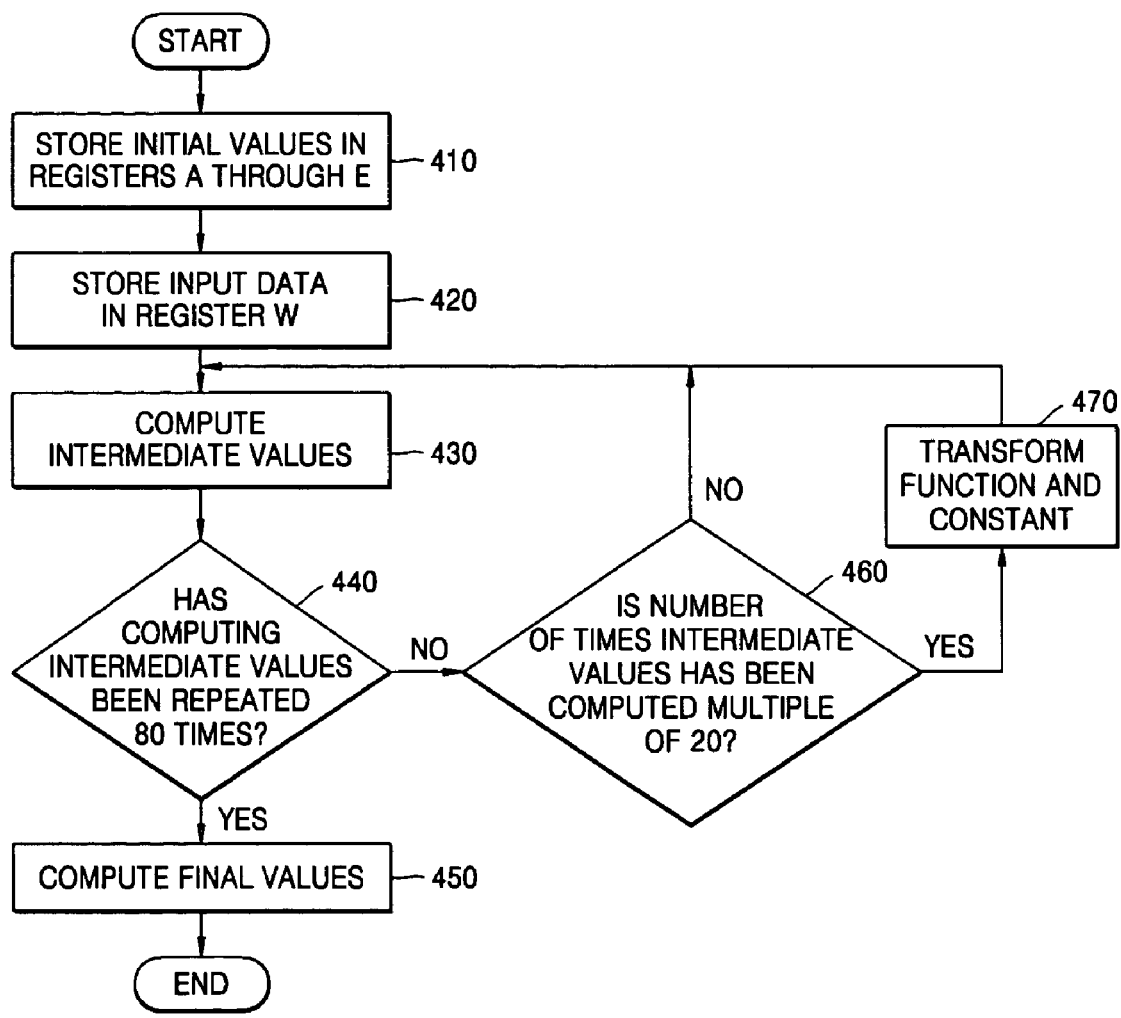
FIG. 4 is a flowchart illustrating a method of computing a SHA-1 hash function value according to an embodiment of the present invention.

FIG. 4 is a flowchart illustrating a method of computing a SHA-1 hash function value, according to an embodiment of the present invention. Referring to FIG. 4, initial values are stored in the register A 101 through the register E 105 of FIG. 1 (S410). Next, when input data is stored in the Register W 106 (S420), values A, B, C, D, E, and W stored in the respective register A 101 through the register W 106, respectively, are processed to obtain new values A', B', C', D', E', and W', these new values are stored in the respective registers, and an intermediate value thereof is computed (S430). Computation of the intermediate value was in detail described above using a rounding operation with reference to FIG. 1, and therefore, a description thereof will be omitted.

Next, it is determined whether computing of intermediate values has been repeatedly performed 80 times (S440). If the number of times intermediate values has been computed is smaller than 80, it is determined whether the number of times intermediate values have been computed is a multiple of 20 (S460). Whenever it is determined that the number of times is a multiple of 20, a function and a constant used by the register A 101 are transformed (S470). After computing an intermediate value 80 times, the stored values A', B', C', D', and E' are combined with the initial values to obtain final values (S450).

As described above, a method and apparatus for computing a SHA-1 hash function value according to the present invention allow a hash function value to be quickly obtained by computing both a value of an output of a Register W and the hash function value. Also, a signal for controlling transformation of an F_function is generated using a value of a counter in a controller, and an operation required for computation of a hash function value is performed using the signal, thereby simplifying the operation. Further, since the register W shifts the value of the inner registers w0 through w15 by 32 bits in the left direction, an output of the register W is equivalent to that of a w0 register, thereby allowing the Register W to be easily controlled.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for computing a SHA-1 hash function to allow compression of a message, the apparatus comprising:
   a first register unit including a plurality of registers that store a first bit string of predetermined lengths for generation of a hash function value;
   a second register unit storing input data in units of second bit strings with predetermined lengths, and sequentially outputting the second bit strings;
   a third register unit performing an operation on the first bit string of the plurality of registers and the second bit strings output from the second register unit so as to generate and store a third bit string, and updating first-bit string of the plurality of registers based on the third bit string; and
   an adding unit combining the first bit string stored in the first register unit, the first bit string of the third bit string stored in the third register unit, and the original initial values stored in the first register unit so as to obtain a hash function value, wherein the second register unit comprises:
   a shift register dividing the input data into units of 32 bits to obtain first through sixteenth W data, outputting the first W data that is the most significant 32 bit data, and shifting the input data by 32 bits in the left direction; and
   a feedback unit performing an exclusive OR (XOR) operation on a result of performing the XOR operation on the first and third W data and a result of performing the XOR operation on the ninth and fourteenth W data, shifting a final result of the XOR operation by a 1 bit, and feeding back a result of shifting.

2. The apparatus of claim 1, wherein the plurality registers of the first register unit comprise a register B, a register C, a register D, and a register E,
   wherein the register B receives the third bit strings from the third register unit and updates first bit string in the register B with the third bit string,
   the register C performs a shift operation on the third bit string and updates the first bit string stored in the register C with a result of shift operation, and
   the register D and register E update their first bit strings with the result of the shift operation output from the register C.

3. The apparatus of claim 2, wherein the third register unit comprises:
   a function operation unit calculating an F_function value using the initial values stored in the registers B through D;
   a first adder combining the second bit strings output from the second register unit and the initial value of the register E;
   a second adder combining a result of shift operation input from the shift operation unit and a result of calculation input from the function operation unit;
   a third adder combining a predetermined constant and a result of combination input from the first adder to obtain the third bit string; and
   a rotation operator performing a shift operation in the third bit string stored in the third register unit.

4. The apparatus of claim 1, wherein the updating of the initial values of the first register unit and the outputting of the second bit strings of the second register unit are performed for predetermined periods, and
   wherein the adding unit outputs the hash function value when the intermediate values have been computed 80 times.

5. A method for computing a SHA-1 hash function to allow compression of a message, the method comprising:
   (a) storing initial values in registers A, B, C, D, and E;
   (b) dividing input data into bit strings of predetermined lengths, storing the bit strings in a register W, and outputting the stored bit strings;
   (c) performing a predetermined logic operation on the respective initial values stored in the registers A, B, C, D, and E, and the bit strings stored in the register W;
   (d) calculating intermediate values of the registers A, B, C, D, and E based on a result of the predetermined logic operation, updating the initial values of the registers A, B, C, D, and E with their intermediate values, and storing the updated initial values in the registers A, B, C, D, and E;
   (e) repeatedly performing (a) through (e) a predetermined number of times, and obtaining final values of the registers A, B, C, D, and E by combining the respective intermediate values stored in the registers A, B, C, D, and E with their original initial values,
   wherein during (b), the input data is divided into 32-bit 16 W data, the first W data of 32-bit 16 W data stored in the Register W is output, the 16 W data is shifted by 32 bits, an exclusive OR (XOR) operation is performed on a result of performing the XOR operation on the first and third W data and a result of performing the XOR operation on the ninth and fourteenth W data, a final result of performing the XOR operation is rotationally shifted by 1 bit, and a result of rotationally shifting is fed back to the fifteen W data, the first W data being the most significant data.

6. The method of claim 5, wherein during (b), a predetermined logic operation is performed on predetermined bit strings stored in the register W, a result of logic operation is fed back to store the result in the register W, the stored result is shifted by 32 bits, and a result of shifting is stored in the register W.

7. The method of claim 5, wherein (c) comprises:
(c1) obtaining the intermediate values by calculating predetermined bit values using a result of rotationally shifting a value A stored in the Register A by 5 bits; a result of performing an operation on the initial values stored in the registers B, C, and D; a result of performing an operation on values C and D stored in the registers C and D using a predetermined function; a value E stored in the register E; a predetermined constant; and input value stored in the register W;

(c2) updating the initial value of the register B with its intermediate value; (c3) updating the initial value of the register C with a result of shifting its intermediate value by 30 bits in the left direction; and (c3) updating the initial values of the registers D and E with the initial value of the register C.

8. The method of claim 5, wherein during (e), when the calculating of intermediate values of the registers A, B, C, D, and E has been performed 80 times, their final values are calculated.

* * * * *